United States Patent [19]

Schott et al.

[11] Patent Number: 4,623,954
[45] Date of Patent: Nov. 18, 1986

[54] HANDLEBAR SAFETY LIGHT

[75] Inventors: Roger A. Schott, Redford; Lawrence A. Schott, Detroit, both of Mich.

[73] Assignee: Freedom Industries, Inc., Redford, Mich.

[21] Appl. No.: 763,648

[22] Filed: Aug. 8, 1985

[51] Int. Cl.⁴ .............................................. F21V 33/00
[52] U.S. Cl. ..................................... 362/72; 362/200; 362/201
[58] Field of Search ............... 362/186, 194, 202, 203, 362/208, 255, 377, 195, 157, 72, 200, 201; D8/303; 74/551.1

[56] References Cited

U.S. PATENT DOCUMENTS 1,427,138  8/1922  Walicki ................................. 362/157
2,469,944  5/1949  Bauters ................................. 362/72

FOREIGN PATENT DOCUMENTS 1111969  7/1961  Fed. Rep. of Germany ........ 362/72
405118   2/1933  United Kingdom .................. 362/72

Primary Examiner—William A. Cuchlinski, Jr.
Assistant Examiner—D. M. Cox
Attorney, Agent, or Firm—Barnes, Kisselle, Raisch, Choate, Whittemore & Hulbert

[57] ABSTRACT

A safety light for removable assembly to a bicycle handlebar or the like comprising a battery shell of conductive sheet metal construction having cantilevered inwardly projecting tabs at one end for resilient electrical contact with batteries captured therein and an opening at the opposing end for threadably receiving a lamp. The shell is contoured for sliding press-fit insertion into the open end of a tubular handlebar. A lens is mounted on the bulb of the lamp and has a head for endwise abutment with the handlebar end. A skirt integrally extends from the lens head surrounding the lamp and is closely received internally of the handlebar end for absorbing the shock of impacts on the handlebar end.

7 Claims, 10 Drawing Figures

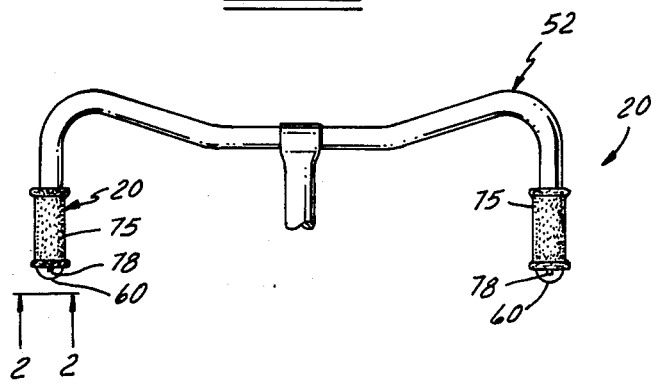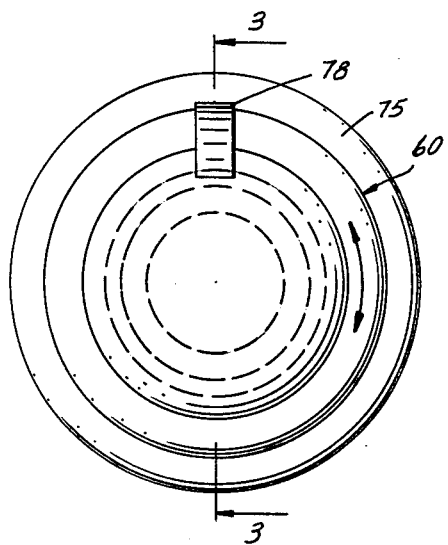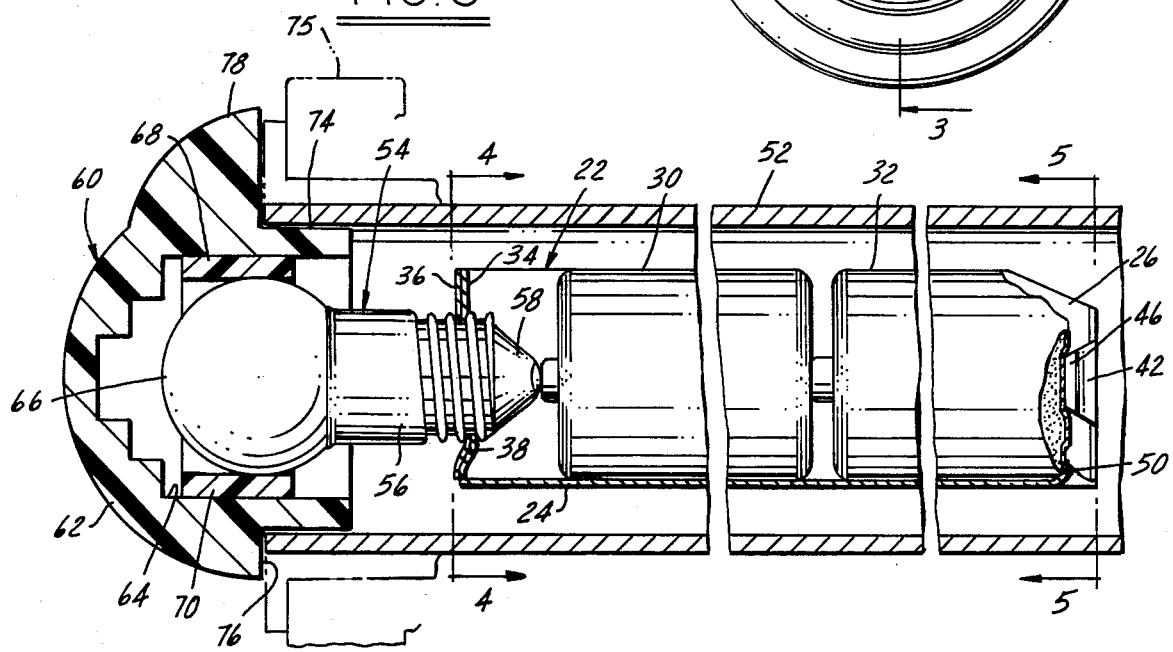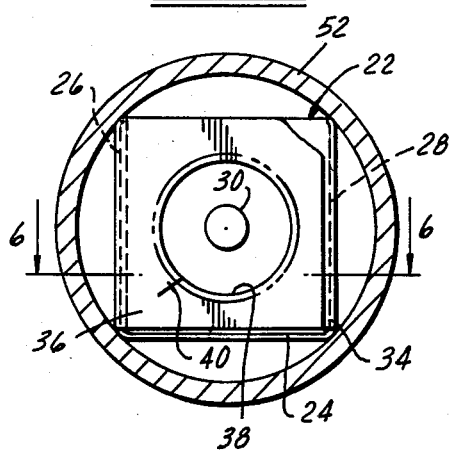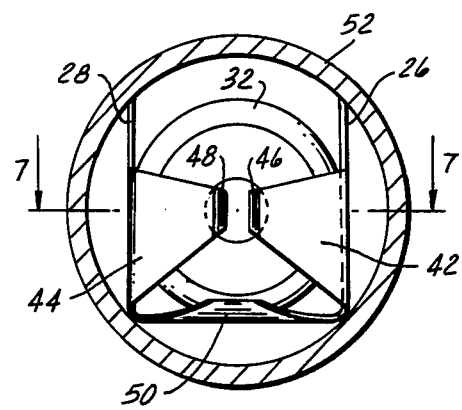

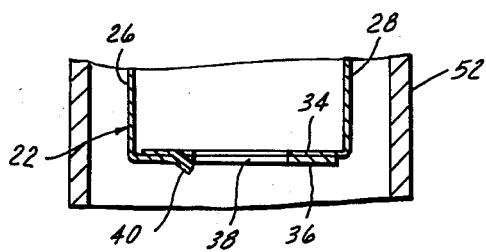
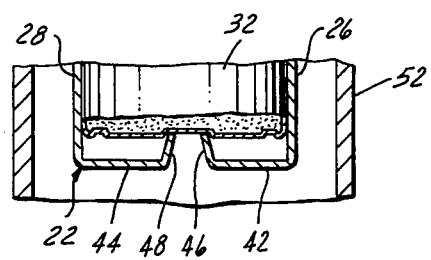
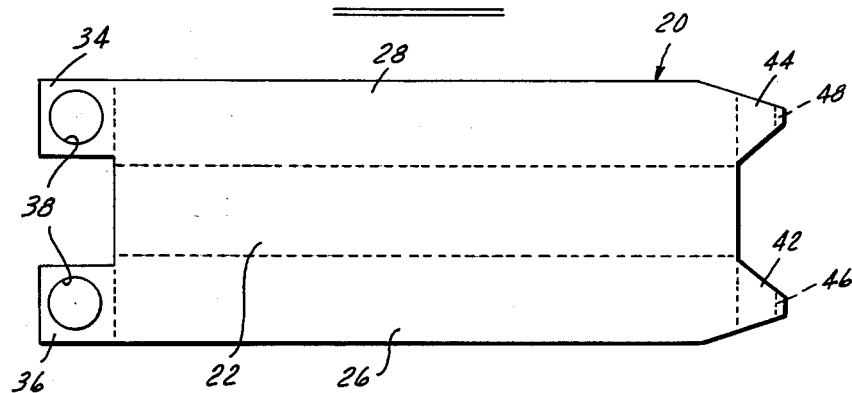
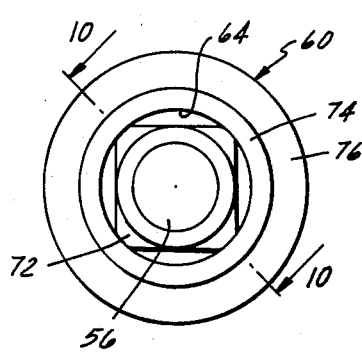
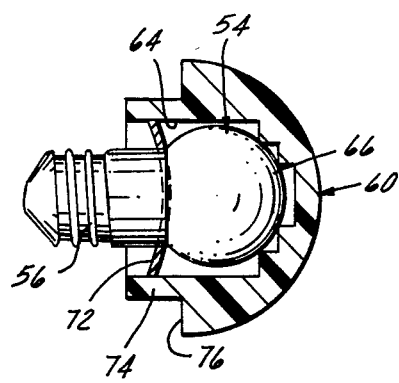

HANDLEBAR SAFETY LIGHT

The present invention is directed to signal lights of a type adapted for disposition on the remote ends of a handlebar on a bicycle or like vehicle and possessing facility for manual energization to indicate an intent to turn in a lateral direction or to indicate presence of the vehicle to the rear after dark.

Signal lights of the described type, as heretofore proposed in Bauters U.S. Pat. No. 2,469,944, Schadel U.S. Pat. No. 2,603,701, Simoneit U.S. Pat. No. 2,793,284 and German published application 1,111,969 (1961), for example, have generally been characterized by elaborate and expensive construction. It is a general object of the present invention to provide a signal light of the described character which is economical to manufacture and market, which is rugged in use, and which may be readily installed and removed for battery replacement by relatively unskilled personnel.

It is a further object to provide a safety light for bicycles which can serve to illuminate a bicycle at night from the rear and the side and which can also serve as a turn signal at anytime. In addition, the flashing light signal is very economical to operate since two double-A batteries can provide over 100,000 flashes before replacement is needed.

The invention, together with additional objects, features and advantages thereof, will be best understood from the following description, the appended claims and the accompanying drawings in which:

FIG. 1 is a plan view of a bicycle handlebar having a signal light in accordance with the present invention mounted on each end thereof;

FIG. 2 is an end elevational view from the direction 2—2 in FIG. 1 illustrating a signal light in accordance with the invention;

FIG. 3 is a sectional view axially bisecting the light of FIG. 2, being taken substantially along the line 3—3 in FIG. 2;

FIGS. 4 and 5 are sectional views taken substantially along the respective lines 4—4 and 5—5 in FIG. 3;

FIGS. 6 and 7 are fragmentary sectional views taken substantially along the lines 6—6 and 7—7 in FIGS. 4 and 5 respectively;

FIG. 8 is a plan view of the battery shell of the invention at an intermediate stage of manufacture;

FIG. 9 is an end elevational view of a lens and lamp subassembly in accordance with a modified embodiment of the invention; and FIG. 10 is a sectional view taken along the line 10—10 in FIG. 9.

Referring to the drawings, a signal light 20 in accordance with a presently preferred embodiment of the invention includes a rectangular battery case or shell 22 of electrically conductive sheet metal construction. Shell 22 has a flat base 24 with a pair of spaced parallel sidewalls 26,28 integrally projecting therefrom. The top of shell 22 spaced from base 24 is open. Shell 22 is closed at one axial end by a pair of inwardly turned overlapping ears 34,36 integral with sidewalls 28,26 respectively. A circular central opening 38 extends through ears 34,36, and an outwardly struck tab 40 (FIGS. 4 and 6) projects from ear 36 at the circumference of opening 38 and at an angle to the central axis of shell 22. Shell 22 is dimensioned axially and laterally to closely serially capture a pair of AA-size batteries 30,32, with some axial clearance adjacent to opening 38. A pair of tapering wings or flanges 42,44 are integrally cantilevered from shell sidewalls 26,28 at ends thereof remote from opening 38 and terminate in tabs 46,48 which project centrally inwardly of shell 22 for resilient electrical contact with the adjacent terminal surface of battery 32, as best seen in FIGS. 3 and 7. An arcuate lip 50 (FIGS. 3 and 5) curls upwardly from the rear edge of base 24 adjacent to flanges 42,44 for engaging the case of battery 32 and helping to hold the batteries in position.

In accordance with an important feature of the present invention best illustrated in FIGS. 4 and 5, the cross sectional contour of battery shell 22, particularly the height of sidewalls 26,28 from base 24, is designed for axially sliding press-fit insertion into the open end of a tubular handlebar 52, with the corners of shell 22 in sliding engagement with the inside surface of the tubular handlebar. This feature of the invention takes advantage of the fact that tubular handlebars are of generally standard diameter, so that one battery shell size accommodates or fits virtually all handlebars. Moreover, sheet metal construction of shell 22, coupled with absence of a shell wall opposing base 24, accommodates limited distortion of the shell sidewalls, and thereby accommodates variation in tubular inside diameter over a relatively wide range. The walls will flex inwardly to fit slightly smaller inner diameters and may be manually distorted to fit larger diameter handlebars.

In addition, the rectangular cross-section of the battery shell serves to center the assembly in the handlebar so that the lens assembly to be described will fit over the bulb and be centered to enter the inner diameter of the open end of the handlebar.

A lamp 54 (FIG. 3) of conventional off-the-shelf construction has a base 56 threadably received into shell opening 38 so that the lamp contact terminal 58 which projects axially therefrom is brought into electrical engagement with the opposing contact of battery 30. Tab 40 assists such threaded insertion, being angulated from the plane of opening 38 by an amount corresponding to one thread pitch on lamp base 56. A translucent lens 60 has a hemispherical head 62 with a stepped internal bore 64 received over the bulb 66 of lamp 54. In the embodiment of the invention illustrated in FIG. 3, lens 60 is press-fitted onto lamp bulb 66, with multiple elastomeric arcuate sleeve segments 68,70 being resiliently wedged therebetween. In the modified embodiment of the invention illustrated in FIGS. 9–10, a flat rectangular clip 72 has a central opening received over lamp base 56 and corners which engage the inside diameter of lens bore 64 so as to cooperate with bulb 66 to prevent removal of lamp 54 from bore 64. In accordance with another feature of the invention, a circular skirt or collar 74 extends from lens head 60 coaxially surrounding bore 64 and has an outside diameter for relatively close fit internally of handlebar 52. In the event that the bicycle or other vehicle which carries signal light 20 falls in such a way that the handlebar end engages the ground, lens skirt 74 helps isolate the impact shock from the base of lamp 54 and from the battery shell.

In assembly, battery shell 22 is formed in a blanking and bending operation, with an intermediate stage being illustrated in FIG. 8. Ears 34,36 may be soldered or otherwise tacked to the opposing sidewalls 26,28 to help hold shell shape. Lens 60 is of suitable molded plastic construction. Lamp 54 and batteries 30,32 are standard off-the-shelf items. Signal lamp 20 may be sold to original equipment manufacturers or in the aftermarket in pairs as a package, with different color lenses 60 and with handgrips 75 (FIGS. 1-2), if desired.

Batteries 30,32 are placed within shell 22, and lamp 54 having lens 60 mounted thereon is threaded into shell opening 38 until lamp contact 58 engages battery 30 and lamp 54 is illuminated. The assembly is then press-fitted into the open end of a handlebar 52 until the shoulder 76 on lens head 62 externally surrounding skirt 74 is in abutment with the open end of handlebar 52. Lamp 54 is then partially unthreaded from shell 22 by grasping lens 60 and rotating slightly counterclockwise so that the lamp terminal is spaced from battery 30. Thereafter, lamp 54 may be energized as desired by merely rotating lens 60 clockwise until lamp terminal 58 engages battery 30. Lens 60 has a radially projecting external finger 78 (FIGS. 1-3) for indicating angular orientation thereof. It is also contemplated that lamp 54 may be of a type which has self-contained flashing means, so that lamp 54 automatically flashes at periodic intervals when in electrical engagement with battery 30. It will be appreciated, of course, that the lamp circuit is closed by engagement of lamp base 56 with electrically conductive shell 22 and by resilient engagement of flange tabs 46,48 with the opposing contact of battery 32.

The invention claimed is:

1. A signal light for bicycle and like applications having a handlebar with open tubular ends, said signal light comprising a rectangular battery shell of electrically conductive sheet metal construction, said shell having a cross section dimensioned for sliding press-fit of longitudinally extending edges of said shell into an open tubular handlebar end, battery means captured within said shell so as to position battery contacts adjacent to axially spaced ends of said shell, said shell having a circular opening at one axial end of said shell and at least one tab at the opposing end of said shell projecting centrally into said shell integrally with said shell for electrical contact with the adjacent said battery contact, a lamp having a base threadably received in said circular shell opening and a bulb carried by said bases externally of said shell, and a lens having a contoured hollow head mounted on said bulb and a base with a diameter for end abutment with an open handlebar end.

2. A signal light for bicycle and like applications having a handlebar with open tubular ends, said signal light comprising a rectangular battery shell of electrically conductive sheet metal construction dimensioned for sliding press-fit into an open tubular handlebar end, battery means captured within said shell so as to position battery contacts adjacent to axially spaced ends of said shell, said shell having a circular opening at one axial end of said shell and at least one tab at the opposing end of said shell projecting centrally into said shell for electrical contact with the adjacent said battery contact, a lamp having a base threadably received in said circular shell opening and a bulb carried by said base externally of said shell, and a lens having a contoured hollow head mounted on said bulb and a base with a diameter for end abutment with an open handlebar end, said battery shell having parallel sidewalls with opposed inwardly cantilevered flanges at said opposing end of said shell, each of said flanges having a said tab projecting therefrom into said shell, such that said flanges resiliently hold said tabs in electrical engagement with the opposing said battery contact.

3. The signal light set forth in claim 2 wherein said shell has a base from which said sidewalls integrally project, said base having an arcuate lip at said opposing shell end for engagement with said battery means.

4. The signal light set forth in claim 2 wherein said shell includes an angulated tab projecting from said one end at said opening for threadably receiving and engaging said lamp base.

5. The signal light set forth in claim 4 wherein said lens includes a circular collar projecting from said head, said collar having an outside diameter for reception into an open tubular handlebar end.

6. The signal light set forth in claim 5 wherein said lens has an internal bore, and wherein said light further comprises a rectangular clip having a central opening received over said lamp base and corners engaged with said bore for preventing removal of said lamp from said bore.

7. The signal light set forth in claim 5 wherein said lens has an internal bore, and wherein said light further comprises wedge means positioned between said bulb and said bore and capturing said bulb in said bore.

* * * * *